US008210510B2

(12) United States Patent
Li et al.

(10) Patent No.: US 8,210,510 B2
(45) Date of Patent: Jul. 3, 2012

(54) CLAMPING DEVICE FOR PORTABLE ELECTRONIC DEVICE

(75) Inventors: Lei Li, Shenzhen (CN); Ping Chen, Shenzhen (CN); Zhi Cheng, Shenzhen (CN); Jian-Gui Wu, Shenzhen (CN); Hong-Yan Li, Shenzhen (CN); Lin-Sen Dong, Shenzhen (CN); Yong-Zhi Tao, Shenzhen (CN); Chang-Fa Sun, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 132 days.

(21) Appl. No.: 12/685,826

(22) Filed: Jan. 12, 2010

(65) Prior Publication Data

US 2010/0107377 A1 May 6, 2010

Related U.S. Application Data

(62) Division of application No. 11/840,552, filed on Aug. 17, 2007, now abandoned.

(30) Foreign Application Priority Data

Feb. 28, 2007 (CN) .......................... 2007 1 0073415

(51) Int. Cl.

| | |
|---|---|
| ***B25B 5/00*** | (2006.01) |
| ***B25B 1/20*** | (2006.01) |
| ***B25B 27/14*** | (2006.01) |
| ***B23Q 3/00*** | (2006.01) |
| *A44B 99/00* | (2010.01) |

(52) U.S. Cl. .......... 269/246; 269/43; 269/291; 29/281.1

(58) Field of Classification Search .................... 269/43, 269/95, 246–248, 271, 291
See application file for complete search history.

(56) References Cited

U.S. PATENT DOCUMENTS

| | | | | | |
|---|---|---|---|---|---|
| 1,477,219 | A | * | 12/1923 | Halvorsen | 269/60 |
| 1,793,561 | A | * | 2/1931 | Schmieder | 269/37 |
| 2,195,277 | A | * | 3/1940 | Kleinman | 269/249 |
| 2,877,815 | A | * | 3/1959 | Fonken | 269/9 |
| 3,357,697 | A | * | 12/1967 | Zanitsch | 269/203 |
| 4,002,328 | A | * | 1/1977 | Wolff et al. | 269/97 |
| 4,020,540 | A | * | 5/1977 | Casciotti et al. | 29/749 |
| 4,234,176 | A | * | 11/1980 | Goff et al. | 269/156 |
| 4,243,213 | A | * | 1/1981 | Georgian | 269/137 |
| 4,300,754 | A | * | 11/1981 | Lawrence | 269/8 |
| 4,415,149 | A | * | 11/1983 | Rees | 269/88 |
| 4,505,034 | A | * | 3/1985 | Reidt | 29/749 |
| 5,018,711 | A | * | 5/1991 | Johnson | 269/43 |
| 5,467,972 | A | * | 11/1995 | Lee et al. | 269/118 |
| 5,630,576 | A | * | 5/1997 | Williams | 269/45 |
| 5,730,433 | A | * | 3/1998 | Veres | 269/41 |
| 5,816,568 | A | * | 10/1998 | Fox | 269/60 |
| 5,893,553 | A | * | 4/1999 | Pinkous | 269/249 |
| 5,960,843 | A | * | 10/1999 | Witt | 144/372 |

(Continued)

*Primary Examiner* — Lee D Wilson
*Assistant Examiner* — Alvin Grant
(74) *Attorney, Agent, or Firm* — Altis Law Group, Inc.

(57) ABSTRACT

A clamping device for clamping a portable electronic device is provided. The clamping device includes a mounting board and a clamping mechanism. The clamping mechanism includes two adjusting members, two sliding blocks, and a sliding rail. The adjusting members can adjust the positions of the sliding blocks on the sliding rail. The sliding rail is selectively attached to the mounting board, either horizontally or vertically.

11 Claims, 3 Drawing Sheets

U.S. PATENT DOCUMENTS

| | | | | |
|---|---|---|---|---|
| 6,161,825 | A * | 12/2000 | Webster et al. | 269/246 |
| 6,533,246 | B1 * | 3/2003 | Hulligan | 254/45 |
| 6,640,666 | B2 * | 11/2003 | Pliley | 81/6 |
| 7,128,313 | B1 | 10/2006 | Pliley | |
| 7,159,496 | B2 * | 1/2007 | Maes | 83/452 |
| 7,408,129 | B2 * | 8/2008 | Morikazu et al. | 219/121.75 |
| 7,424,991 | B2 * | 9/2008 | Kim et al. | 248/125.9 |
| 7,487,942 | B2 * | 2/2009 | Krohmer | 248/230.9 |
| 7,932,478 | B2 * | 4/2011 | Nomaru et al. | 219/121.68 |
| 2006/0138722 | A1 * | 6/2006 | Webster et al. | 269/246 |

* cited by examiner

CLAMPING DEVICE FOR PORTABLE ELECTRONIC DEVICE

CROSS-REFERENCE TO RELATED APPLICATION

This application is a divisional application of U.S. Ser. No. 11/840,552, filed Aug. 17, 2007 now abandoned the contents of which are hereby incorporated by reference. The patent application Ser. No. 11/840,552 in turn claims the benefit of priority under 35 USC 119 from Chinese Patent Application 200710073415.1, filed on Feb. 28, 2007.

BACKGROUND

1. Technical Field

The present disclosure relates to clamping devices, and, particularly to a clamping device facilitating clamping/holding a portable electronic device during a testing and/or assembly process.

2. Description of Related Art

When portable electronic devices (e.g., personal digital assistants (PDAs) and mobile phones) are manufactured, the portable electronic devices generally require series of tests before distributed out on the market (e.g., physical or electronic tests). One physical test essentially involves applying a clamping device to facilitate clamping of the portable electronic device during the test.

Typically, a clamping device is particularly used to clamp a portable electronic device with a fixed size or shape. In other words, the present clamping device cannot clamp other portable electronic devices with a different size or shape. One particular clamping device corresponds to one type of portable electronic device with a particular size or shape. Thus, during the testing process, a plurality of clamping devices is inevitably implemented/mounted to clamp various kinds of portable electronic devices. It is definitely costly and time-consuming to employ a variety of clamping devices, which results in a low efficiency of the whole test.

Therefore, there is room for improvement within the art.

BRIEF DESCRIPTION OF THE DRAWING

Many aspects of the new housing and method for fabricating the same can be better understood with reference to the following drawings. The components in the drawings are not necessarily drawn to scale, the emphasis instead being placed upon clearly illustrating the principles of the new housing and method for fabricating the same. Moreover, in the drawings, like reference numerals designate corresponding parts throughout the several views.

DETAILED DESCRIPTION

Figure 1:
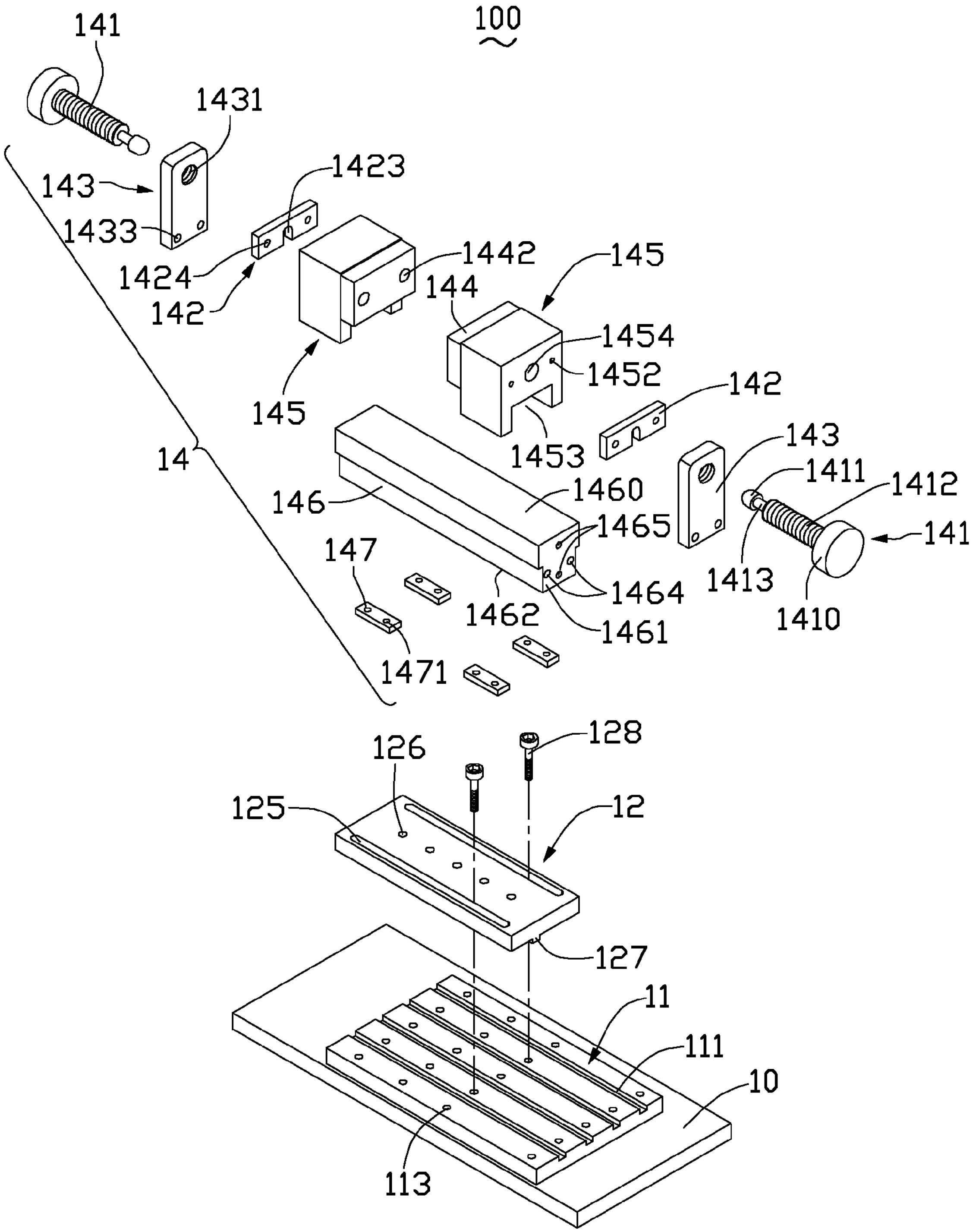
FIG. 1 is an exploded, isometric view of a clamping device for a portable electronic device, in accordance with a present embodiment.
Figure 2:
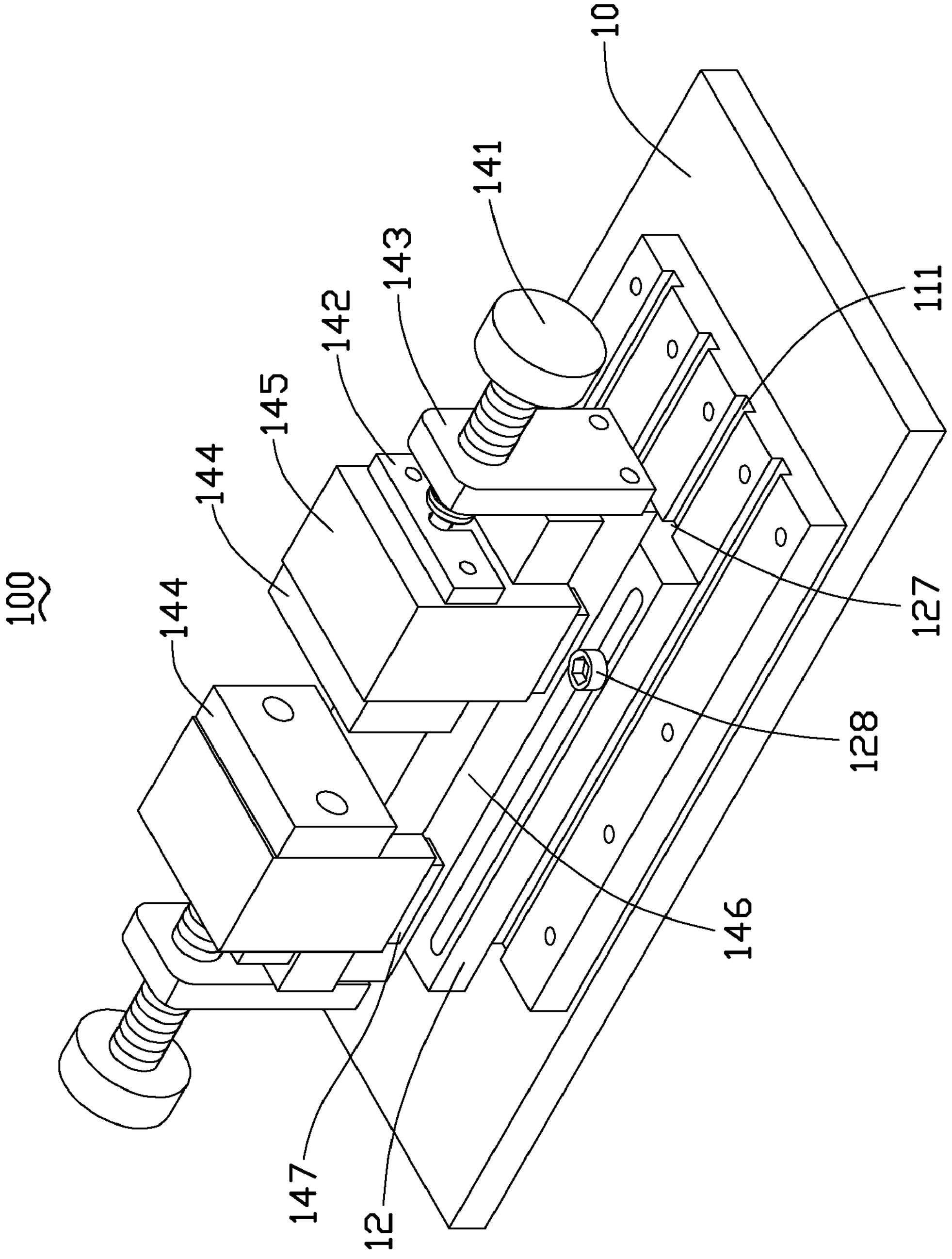
FIG. 2 is an assembled view of the clamping device shown in FIG. 1, illustrating one clamping status thereof.
Figure 3:
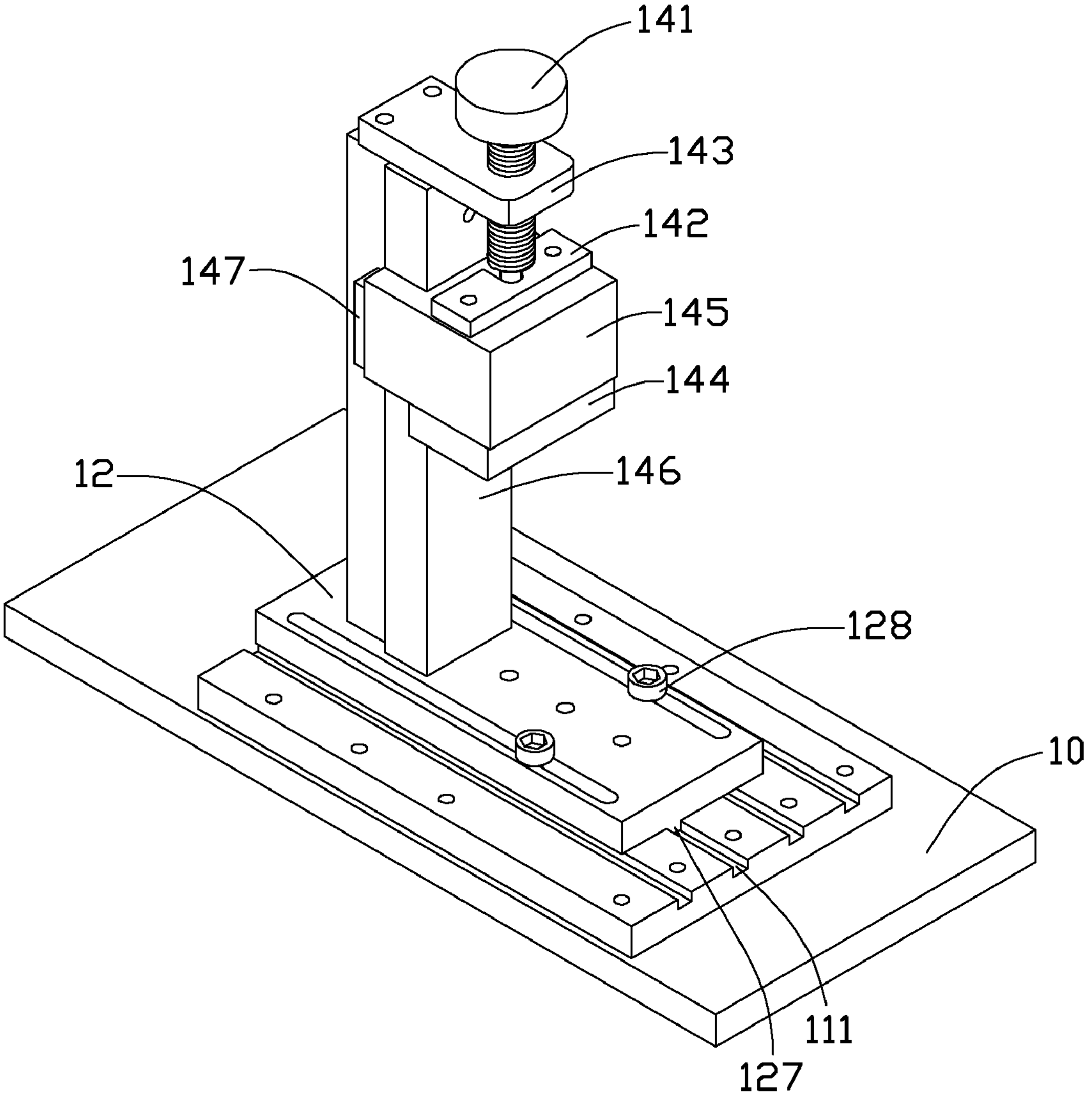
FIG. 3 is another assembled view of the clamping device shown in FIG. 1, illustrating another clamping status thereof.

The present clamping device for a portable electronic device is described here, in conjunction with the accompanying drawings in FIGS. 1-3. The clamping device is suitable in clamping a portable electronic device, such as a mobile phone, a digital camera, or the like, during testing processes (e.g., physical or electric tests) and/or, potentially, during assembly thereof.

Referring now to FIG. 1, the clamping device 100 includes an operating platform 10, a base board 11, a mounting board 12, and a clamping mechanism 14. The base board 11 can be assembled (e.g., screwed) or fixed (e.g., welded) with the operating platform 10. The mounting board 12 can be assembled with the base board 11 and selectably located/positioned at any of various positions adjacent an upper surface of the base board 11, via a slide connection therewith. The mounting board 12 can be otherwise fixed with the base board 11 and positioned at a specified, retainable position of the upper surface of the base board 11. The clamping mechanism 14 can be assembled with the mounting board 12 at a fixed position relative thereto.

The operating platform 10 includes an upper surface (not labeled). The upper surface is usefully configured (i.e., structured/arranged), for example, as a smooth and planar surface for the purpose of steadily mounting the base board 11 with the operating platform 10.

The base board 11 includes a plurality of mounting grooves 111 and a plurality of mounting holes 113 therein. The mounting grooves 111 are advantageously defined/aligned parallel to each other and arranged/distributed evenly with/at a same distance from any adjacent groove 111. Further, the mounting grooves 111 extend along the long direction of the base board 11. Each mounting groove 111 is defined through/within an upper portion 1460 of the base board 11. The mounting holes 113 are also advantageously defined through the upper portion 1460 of the base board 11 and arranged/distributed evenly on/along two sides of a respective mounting groove 111. The mounting holes 113 are advantageously screw holes that facilitate combining/assembling the mounting board 12 with the base board 11 at distinct locations relative to one another.

The rectangular-shaped mounting board 12 includes two opposite sidewalls (not labeled). One sidewall (i.e., clamp-facing wall) has two through grooves 125 (i.e., effectively through-slots) and a plurality of first holding holes 126 defined therethrough. The other sidewall (i.e., base-facing wall) has a protrusion 127 formed thereon, integrally extending therefrom and essentially orthogonal thereto. The two through grooves 125 are further defined through the other sidewall and are aligned parallel to each other. One through groove 125 is usefully configured for corresponding to (i.e., aligning with) one row of the mounting holes 113 of the base board 11, and the other through groove 125 is usefully configured for corresponding to (i.e., aligning with) another row of the mounting holes 113 of the base board 11.

The protrusion 127 is also usefully configured for being able to be slidably received in a corresponding mounting groove 111 of the base board 11. As such, the mounting board 12 can be assembled with the base board 11 via the two screws 128 engaging through two through grooves 125 and with the two mounting holes 113 and via the protrusion 127 slidably engaging in the mounting groove 111. If necessary, the position of the assembled mounting board 12 can be slidably adjusted relatively to the assembled base board 11 and then held in the new desired location with the two screws 128. It is to be understood that the screws 128 are, in their broadest sense, threaded fasteners, and for the purposes of their application here, bolts could fulfill the purpose of such fasteners.

The first holding holes 126 of the mounting board 12 are advantageously arranged in a line and spaced evenly. The first holding holes 126 are located between the two through grooves 125 of the mounting board 12. The first holding holes 126 are used, in conjunction with one or more corresponding threaded fasteners (not shown), to hold the clamping mechanism 14 with the mounting board 12.

The clamping mechanism 14 includes two adjusting members 141, two resisting members 142, two guiding members 143, two clamping members 144, two sliding blocks 145, a sliding rail 146, and four limiting members 147.

Each adjusting member 141 of the clamping mechanism 14 includes an operating portion 1410, a resisting portion 1411, an adjusting portion 1412, and a connecting portion 1413. The adjusting member 141 is advantageously a screw/bolt. Correspondingly, the operating portion 1410 is a head end of the screw/bolt, and the resisting portion 1411 is an opposite end of the screw/bolt. The adjusting portion 1412 is a threaded portion of the screw/bolt. Two ends of the connecting portion 1413 connect the resisting portion 1411 and the adjusting portion 1412, respectively.

The operating portion 1410 is used to operate/rotate the adjusting member 141 within the assembled clamping mechanism 14. The operating portion 1410 may advantageously include (although not particularly shown) at least one of a screwdriver slot (e.g., Philips or flat), a hexagon or Allen head (i.e., wrench-operable), or a grip-promoting surface, so as to facilitate the operation/rotation thereof. The resisting portion 1411 is usefully dimensioned so as to be slightly larger than the connecting portion 1413. Its function is to prevent the adjusting member 141 from falling from the assembled clamping mechanism 14. The function of the resisting portion 1411 is to resist/bias and push upon the sliding block 145 during the clamping process using the clamping mechanism 14. The function of the adjusting portion 1412 is to facilitate adjustment of the position of the adjusting member 141, as needed (often only slight adjustments are required), within the clamping mechanism 14.

Each resisting member 142 of the clamping mechanism 14 is generally a rectangular board. The resisting member 142 has a retaining groove 1423 and two first fixing holes 1424 defined therethrough. The retaining groove 1423 has essentially a shape and size mating/matching with that of the connecting portion 1413 of the adjusting member 141. The resisting member 142 is configured such that, when assembled with the adjusting member 141, the connecting portion 1413 is retained in the retaining groove 1423. Thus, the adjusting member 141 cannot fall from the resisting member 142. The two first fixing holes 1424 are beneficially screw holes and are located at two sides of the retaining groove 1423. The function of the first fixing holes 1424 is to fix the resisting member 142 with the sliding block 145.

Each guiding member 143 of the clamping mechanism 14 is generally a rectangular board. The guiding member 143 has a guiding hole 1431 and two first securing holes 1433 defined therethrough. The guiding hole 1431 is advantageously a screw hole that corresponds to the adjusting portion 1412 of the adjusting member 141.

As assembled, the adjusting member 141 can be rotated and thereby move linearly relative to the guiding member 143, due to the threaded action. The two first securing holes 1433 beneficially are screw holes located at a bottom side of the guiding hole 1431. The function of the first securing holes 1433 is facilitate securing/attaching the guiding member 143 with the sliding rail 146.

Two clamping members 144 of the clamping mechanism 14 are generally rectangular boards, and each contains two attaching holes 1442 defined therethrough. The two attaching holes 1442 are advantageously screw holes, and the function of each is to facilitate attachment of the clamping member 144 with the sliding block 145. The clamping members 144 can otherwise be of another shape (e.g., spherical shape) corresponding to a given exterior surface/contour of the portable electronic device being held therewith.

The sliding blocks 145 of the clamping mechanism 14 are generally cube-shaped, and each includes a sliding groove 1453, four first engaging holes (not shown), a blind hole 1454, and two second fixing holes 1452. The sliding groove 1453 generally has a rectangular shape and is configured such that the sliding block 145 can slide freely and stably with respect to the sliding rail 146, via the sliding engagement of the sliding rail 146 and the sliding groove 1453. The four first engaging holes are, opportunely, screw holes, and a respective two are positioned at one respective side of the sliding groove 1453. The blind hole 1454 corresponds to the resisting portion 1411 of the adjusting member 141. The blind hole 1454 is configured to accommodate the resisting portion 1411, allowing the resisting portion 1411 to rotate therein. As assembled, the resisting portion 1411 is accommodated in the blind hole 1454 and resists the sliding block 145. The second fixing holes 1452 correspond to (i.e., align with) the first fixing holes 1424 of the resisting member 142.

The sliding rail 146 of the clamping mechanism 14 is a long rod with a cross section of a "T" shape. The sliding rail 146 includes an upper portion 1460, two opposite T-shape side portions 1461, and a lower portion 1462. The upper portion 1460 has a shape and size that permits close mating (i.e., slide fitting) thereof with the sliding groove 1453 of the sliding block 145. Each side portion 1461 has two second securing holes 1464 and two second holding holes 1465 defined therein. The second securing holes 1464 are arranged in a horizontal line, and the second holding holes 1465 are arranged in a vertical line. As such, the vertical line is perpendicular to the horizontal line. The second securing holes 1464, respectively, correspond to (i.e., align with) the first securing holes 1433 of the guiding member 143. Each second securing hole 1464 has essentially the same shape and size as that of the respective first securing hole 1433. The second securing holes 1464 are alignable with the first securing holes 1433 to facilitate the attachment between the sliding block 145 and the guiding member 143.

The second holding holes 1465, respectively, correspond to (i.e., align with) the first holding holes 126 of the guiding member 143. Each second holding hole 1465 has essentially the same shape and size as that of the respective first holding hole 126. The two second holding holes 1465 are respectively closely combined/aligned with the two first holding holes 126 (i.e., two hole pairings) to facilitate the attachment between the sliding rail 146 and the mounting board 12, as shown in FIG. 3.

The lower portion 1462 of the sliding rail 146 has a plurality of third holding holes (not shown) defined therein. The third holding holes, respectively, correspond to (i.e., align with) the first holding holes 126 of the guiding member 143. Each third holding hole has essentially the same shape and size as that of the respective first holding hole 126. The third holding holes mate/pair with the first holding holes 126 and bolts/screws to facilitate an attachment between the sliding rail 146 and the mounting board 12. At this time, due to first holding holes 126 defined through the given projection 127 of the mounting board 12, any head of one bolt/screw may advantageously be sunk into the projection 127 so as not to interfere with the slide fit of the projection 127 with the mounting groove 111 of the base board 11.

Each limiting member 147 of the clamping mechanism 14 is advantageously a rectangular sheet and has two second engaging holes 1471 defined therethrough. The second engaging holes 1471, respectively, correspond to (i.e., align with) the first engaging holes of the sliding block 145. Each second engaging hole 1471 has essentially the same shape and size as the respective first engaging hole. The second engaging holes 1471 correspondingly mate/pair with the respective first engaging holes to facilitate the attachment between the sliding rail 146 and the sliding blocks 145. As assembled, the limiting members 147 combined with the sliding blocks 145 can slide freely along the sliding rail 146. As a result of that, the sliding blocks 145 cannot slide away from the sliding rail 146, via the limiting members 147 engaging with the upper portion 1460 of the sliding rail 146.

The clamping device 100 can be assembled and then operate in two different statuses. One status is a horizontally clamped status (shown in FIG. 2), and the other is a vertically clamped status (shown in FIG. 3). In the horizontally clamped status, the clamping device 100 is assembled in a way that the clamping device 100 can clamp the portable electronic device in a horizontal direction. In the vertically clamped status, the clamping device 100 is assembled in a way that the clamping device 100 can clamp the portable electronic device in a vertical direction.

In assembly, the assembly procedures of the operating platform 10, the base board 11, and the mounting board 12 are essentially the same, for both the horizontal and vertical clamped status. Firstly, referring FIG. 2 or 3, the base board 11 is threadedly attached (e.g., via bolts/screws) with the operating platform 10. Secondly, the protrusion 127 of the mounting board 12 is inserted and accommodated into a given mounting groove 111 of the base board 11. As a result of that, two rows of the mounting holes 113 are respectively aligned with the two through grooves 125 of the mounting board 12. Thirdly, the two screws 128 are screwed in through the through grooves 125 and rotated threadingly into two of the mounting holes 113. At this time, the mounting board 12 is firmly attached with the base board 11 and the operating platform 10.

Referring now to FIG. 2, in the horizontally clamped status, the assembled clamping device 100 can further be assembled in series of steps. The sliding rail 146 is firmly secured to the mounting board 12, via the third holding holes of the sliding rail 146 being threadingly secured with the first holding holes 126 of the mounting board 12. In this case, the lower portion 1462 of the sliding rail 146 contacts/resists an upper surface of the mounting board 12. The sliding rail 146 is disposed horizontally along the mounting board 12. Then, the clamping members 144 are respectively threaded/secured to a side of the sliding block 145. In this case, the clamping member 144 is located opposite to the blind hole 1454 of the sliding block 145.

For the next process, the sliding blocks 145 are respectively placed on two ends of the sliding rail 146 with the upper portion 1460 of the sliding rail 146, engaging into the sliding groove 1453. Two clamping members 144 are placed on/at an opposite side of each other. The four limiting members 147 of the clamping mechanism 14 are respectively screwed/secured with the sliding block 145. Each guiding member 143 of the clamping mechanism 14 is threadingly attached to the respective side portion 1461 of the sliding rail 146, via the first securing holes 1433 and the second securing holes 1464. Thus, the clamping member 144, the sliding block 145, and the guiding member 143 are all arranged/assembled, in sequence, on the sliding rail 146. The guiding hole 1431 of the guiding member 143 and the blind hole 1454 of the sliding block 145 are linearly aligned with one another. Then, each adjusting member 141 is rotated threadingly into the guiding hole 1431 and passed through the guiding hole 1431.

Each adjusting member 141 is further rotated to such extent that the resisting portion 1411 is accommodated in the blind hole 1454 and, ultimately, resists (i.e., biases against) the sliding block 145. Finally, the resisting members 142 of the clamping mechanism 14 are directed/oriented toward the adjusting member 141, with the connecting portions 1413 of the adjusting members 141 engaging into the retaining grooves 1423 of the resisting members 142. The resisting members 142 are further secured to the sliding block 145, via the first fixing holes 1424 of the resisting member 142 and the second fixing holes 1452 of the sliding block 145.

In use, referring again to FIG. 2, the portable electronic device is placed between the two sliding blocks 145 combined with the two clamping members 144. The operating portion 1410 of the adjusting member 141 is operated/rotated. Thus, the adjusting member 141 is rotated around an axis of the guiding hole 1431 of the guiding member 143 and, by screw action, moves linearly into the guiding member 143. Subsequently, the resisting portion 1411 of the adjusting member 141 resists and urges the sliding block 145, combined with the clamping member 144, to move toward the other sliding block 145, combined with the other clamping member 144. The two sliding blocks 145, combined with the respective two clamping members 144, are adjusted along the sliding rail 146. The distance between the two sliding blocks 145 is also adjusted. The portable electronic device is clamped/held by the two clamping members 144, through appropriate adjustment of the sliding blocks 145.

Referring to FIG. 3, in the vertically clamped status, the assembled clamping device 100 can alternatively be assembled using another series of steps. The sliding rail 146 is firmly secured to the mounting board 12, by threadingly securing two second holding holes 1465 of the sliding rail 146 with two respective ones of the first holding holes 126 of the mounting board 12. In this case, one side portion 1461 of the sliding rail 146 contacts/resists an upper surface of the mounting board 12. The sliding rail 146 is essentially disposed perpendicular to the upper surface of the mounting board 12. In the remaining procedures/steps of the assembly, one adjusting member 141, one guiding member 143, one resisting member 142, one sliding block 145 and one clamping member 144 are applied to fulfill the clamping of the clamping device 100.

The clamping member 144 is threaded/secured to a side of the sliding block 145. In this case, the clamping member 144 is located on the opposite side of the blind hole 1454 of the sliding block 145. Subsequently, the sliding block 145 is placed on a distal end of the sliding rail 146, with the upper portion 1460 of the sliding rail 146 engaging into the sliding groove 1453. The clamping member 144 is placed on the opposite side of the upper surface of the mounting board 12. The two limiting members 147 of the clamping mechanism 14 are, respectively, screwed into/secured with the sliding block 145. The guiding member 143 of the clamping mechanism 14 is threadingly attached to the side portion 1461 of the sliding rail 146 via the first securing holes 1433 and the second securing holes 1464. Thus, the clamping member 144, the sliding block 145, and the guiding member 143 are all arranged/assembled, in sequence, on the sliding rail 146. The guiding hole 1431 of the guiding member 143 and the blind hole 1454 of the sliding block 145 are linearly aligned with one another.

Then, the adjusting member 141 is rotated threadingly into the guiding hole 1431 and then passed through the guiding hole 1431. The adjusting member 141 is further rotated to such extent that the resisting portion 1411 is accommodated in the blind hole 1454 and, ultimately, driven to resist the sliding block 145. Finally, the resisting member 142 of the clamping mechanism 14 is placed/directed toward the adjusting member 141, with the connecting portion 1413 of the adjusting member 141 engaging into the retaining groove 1423 of the resisting member 142. The resisting member 142 is further secured to the sliding block 145, via the first fixing holes 1424 of the resisting member 142 and the second fixing holes 1452 of the sliding block 145.

In use, referring again to FIG. 3, the portable electronic device is placed between the sliding block 145 combined with the clamping members 144 and the upper surface of the mounting board 12. The operating portion 1410 of the adjusting member 141 is operated in a rotation mode. Thus, the adjusting member 141 is rotated around the axis of the guiding hole 1431 of the guiding member 143 and, by thread action, moves linearly into the guiding member 143. Subsequently, the resisting portion 1411 of the adjusting member 141 resists and urges the sliding block 145, combined with the clamping member 144, to move towards the upper surface of the mounting board 12. The sliding block 145, combined with the clamping member 144, is adjusted along the sliding rail 146. The distance is also adjusted between the sliding block 145 and the mounting board 12. The portable electronic device is clamped/held by the clamping member 144 and the upper surface of the mounting board 12, upon adjustment of the sliding block 145.

The clamping device 100 can be assembled and can operate in the horizontally clamped status (shown in FIG. 2) or in the vertically clamped status (shown in FIG. 3). As such, the portable electronic device can be clamped horizontally or vertically, as desired. Thus, the clamping device 100 can potentially be adjusted and assembled in two different clamped statuses, so as to clamp portable electronic devices with different shapes, sizes, and/or configurations, instead of being replaced with another different clamping device. The working efficiency thereof is thus enhanced, and the cost is correspondingly decreased.

In alternative embodiments of the clamping device 100, the clamping member 144 of the clamping mechanism 14 may be manufactured integrally with the sliding block 145 of the clamping mechanism 14. The clamping member 144 may be removed from the clamping mechanism 14. In this case, two sliding blocks 145 may clamp the portable electronic device in a horizontally clamped status, or one sliding block 145 and the upper surface of the mounting board 12 may vertically clamp the portable electronic device therebetween. Further, the guiding member 143 of the clamping mechanism 14 may be manufactured integrally with the sliding rail 146 of the clamping mechanism 14.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A clamping device, comprising:

a base board;

a mounting board configured for mounting with the base board at various positions; and a clamping mechanism mounted on the mounting board, comprising:

a sliding rail selectively attachable to the mounting board at various horizontal and vertical positions relative to the mounting board, so that the clamping mechanism can be positioned at a different position depending on which one of the various positions is used;

two sliding blocks slidably mounted to the sliding rail, a side of each sliding block defining a blind hole therein; and two adjusting members respectively engaging with the sliding blocks and driving the sliding blocks to move along the sliding rail, each adjusting member comprising an operating portion, a resisting portion, a connecting portion, and an adjusting portion, the connecting portion connecting the resisting portion and the adjusting portion, and the resisting portion engaging in the blind hole.

2. The clamping device as claimed in claim 1, wherein the clamping mechanism further comprises two resisting members attached to the sliding blocks respectively, the resisting members each have a retaining groove defined therethrough, and the connecting portions are retained in the retaining grooves.

3. The clamping device as claimed in claim 2, wherein the clamping mechanism further comprises two guiding members attached to the sliding rail, each guiding member has a guiding hole defined therethrough, and the adjusting portions of the adjusting members engage in the guiding holes.

4. The clamping device as claimed in claim 2, wherein the clamping mechanism further comprises two guiding members, each guiding member has a guiding hole defined therethrough, the adjusting portion of each adjusting member engages into the respective guiding hole, and the guiding members are integrally formed with the sliding rail.

5. The clamping device as claimed in claim 2, wherein the sliding rail comprises an upper portion, a lower portion, and two side portions, the lower portion is mounted to the mounting board, and each sliding block is mounted to the upper portion.

6. The clamping device as claimed in claim 5, wherein one of the two side portions is mounted to the mounting board, and each sliding block is mounted to the upper portion.

7. The clamping device as claimed in claim 6, wherein the sliding block defines a sliding groove therein, and the upper portion of the sliding rail engages into the sliding groove.

8. The clamping device as claimed in claim 5, wherein one of the two side portions has at least one holding hole defined therein, and each holding hole is configured to facilitate horizontally or vertically attaching the sliding rail to the mounting board.

9. The clamping device as claimed in claim 1, wherein the base board comprises at least one mounting groove defined therein, the at least one mounting board includes a protrusion formed thereon, and the protrusion engages into one of the mounting grooves.

10. The clamping device as claimed in claim 9, wherein the mounting board comprises two through grooves defined therethrough, and each through groove is configured to facilitate the mounting board mounting to the base board.

11. The clamping device as claimed in claim 1, wherein the clamping mechanism further comprises at least one limiting member, and each respective limiting member is configured in such a manner that the respective limiting member is attached to the sliding block so that the respective limiting member resists the sliding rail and prevents a corresponding sliding block from falling from the sliding rail.

* * * * *